United States Patent

[11] 3,616,241

[72] Inventor John Andrew Growich, Jr.
 New City, N.Y.
[21] Appl. No. 616,167
[22] Filed Feb. 15, 1967
[45] Patented Oct. 26, 1971
[73] Assignee American Cyanamid Company
 Stamford, Conn.

[54] PROCESS FOR THE PRODUCTION OF 7-CHLORO-5$\alpha$,11$\alpha$-DEHYDROTETRACYCLINE
 3 Claims, No Drawings
[52] U.S. Cl. ........................................ 195/80
[51] Int. Cl. ........................................ C12d 9/00
[50] Field of Search ............................ 195/80;
 260/559

[56] References Cited
 UNITED STATES PATENTS
2,996,499 8/1961 McCormick et al. .......... 195/80 X
3,007,965 11/1961 Growich et al. ............... 195/80 X Primary Examiner—Joseph M. Golian
Attorney—Edward A. Conroy, Jr.

ABSTRACT: This disclosure describes a process of producing 7-chloro-5a,11a-dehydrotetracycline which comprises cultivating, under submerged aerobic conditions, strains of *Streptomyces aureofaciens* which are not riboflavin-deficient and are nonresponsive to Cosynthetic Factor-1, and which produce 7-chloro-5a,11a-dehydrotetracycline to the exclusion of tetracycline and 7-chlorotetracycline.

PROCESS FOR THE PRODUCTION OF 7-CHLORO-5,11-DEHYDROTETRACYCLINE

BRIEF SUMMARY OF THE INVENTION

This invention relates to the production of 7-chloro-5a,11a-dehydrotetracycline by fermentation and, more particularly, is concerned with certain novel mutant strains of S. aureofaciens which possess the property of producing 7-chloro-5a,11a-dehydrotetracycline to the exclusion of tetracycline and 7-chlorotetracycline. These novel mutant strains of S. aureofaciens are not riboflavin deficient and are nonresponsive to Cosynthetic Factor-1.

DETAILED DESCRIPTION OF THE INVENTION

It has been known for some time that micro-organisms of the species S. aureofaciens which produce 7-chloro-5a,11a-dehydrotetracycline also simultaneously produce tetracycline and 7-chlorotetracycline. The concomitant production of tetracycline and 7-chlorotetracycline is objectionable when 7-chloro-5a,11a-dehydrotetracycline is the principal product sought to be produced. Generally, while specification standards permit small quantities of tetracycline and 7-chlorotetracycline to be present in specification quality 7-chloro-5a,11a-dehydrotetracycline, the presence of any sizable quantity of tetracycline or 7-chlorotetracycline is objectionable. Moreover, the presence of these two antibiotics in any sizable amounts in the fermentation mash involves difficult problems of separation in the refining or extraction procedures. possible is possible of course, to extract the antibiotics from the fermentation mash and by selective refining procedures to effect a separation of the product. However, the refining procedures for effecting separation of the antibiotics are not without some difficulty and they will usually involve some loss of the desired 7-chloro-5a,11a-dehydrotetracycline. Moreover, tetracycline and 7-chlorotetracycline, which in those instances where 7-chloro-5a,11a-dehydrotetracycline is the principal product of the fermentation, may be considered contaminants and are customarily discarded since they are usually not present in sufficient quantities to warrant the expense of a separate purification procedure to bring them up to specification standards.

The present invention is based upon the discovery that certain novel mutant strains of S. aureofaciens produce 7-chloro-5a,11a-dehydrotetracycline, to the total exclusion of tetracycline and 7-chlorotetracycline, by fermentation. The S. aureofaciens strains described below are all direct descendents of the 7-chlorotetracycline-producing S. aureofaciens A-377 soil isolate described in U.S. Pat. No. 2,482,055 to Duggar and deposited at the Northern Regional Research Laboratories, Peoria, Ill., and indexed as NRRL-2209. Derivation of these novel mutant strains of S. aureofaciens from the original A-377 strain involved treatment of the A-377 strain with mutagenic agents including ultraviolet radiation, nicotine and nitrogen mustard. Typical mutant strains of S. aureofaciens which possess the unique property of producing 7-chloro-5a,11a-dehydrotetracycline to the total exclusion of tetracycline and 7-chlorotetracycline have been designated by me as S-4596-1 and S-4596-2. Viable cultures representative of these novel mutant strains have been deposited at the Northern Regional Research Laboratories, Peoria, Ill., and have been assigned the following accession numbers:

| Strain | NRRL No. |
| --- | --- |
| S-4596-1 | 3269 |
| S-4596-2 | 3270 |

It is to be understood that spontaneous mutation of 7-chlorotetracycline-producing strains of S. aureofaciens may also result in strains which will produce 7-chloro-5a,11a-dehydrotetracycline to the total exclusion of tetracycline and 7-chlorotetracycline in accordance with the teachings of the present invention.

In general, the novel mutant strains of the present invention are characteristic of the species S. aureofaciens but differ from previously described strains of S. aureofaciens, not only in pigmentation, but also in the fact that they are not riboflavin-deficient (see U.S. Pat. No. 3,007,965 to Growich et al.). That is, the yields of 7-chloro-5a,11a-dehydrotetracycline are not depressed when fermentations are carried out with media low or lacking in riboflavin. The novel mutant strains of the present invention are also nonresponsive to Cosynthetic Factor-1. That is, the addition of Cosynthetic Factor-1 (see U.S. Pat. No. 2,996,499 to McCormick et al.) to a fermentation of the novel mutant strains of Streptomyces aureofaciens of the present invention does not result in the production of 7-chlorotetracycline. The novel mutant strains of S. aureofaciens of the present invention which produce 7-chloro-5a,11a-dehydrotetracycline exclusively possess the same general characteristics as do the strains which also produce both tetracycline and 7-chlorotetracycline, and differ among themselves in the same general manner that the tetracycline-producing and 7-chlorotetracycline-producing strains differ from each other as has been described in a number of scientific papers which have been published.

The conditions of the fermentation with the novel mutant strains of S. aureofaciens of the present invention are generally the same as for the presently known methods of producing 7-chloro-5a,11a-dehydrotetracycline by fermentation. That is, the fermentation medium contains the usual nutrients and mineral substances. Suitable nutrient substances include starch, dextrose, cane sugar, glucose, molasses, soybean meal, milk solids, yeast, meat extracts, peptone, urea, cornsteep liquor, distillers' solubles, fish meal and other conventional substances. The inorganic salts include such things as calcium carbonate, ammonium sulfate, ammonium chloride, and salts of the various trace elements such as manganese, cobalt, zinc, copper, iron and the like.

The other general conditions of the fermentation such as hydrogen ion concentration, temperature, time, rate of aeration, preparation of the inoculum, sterilization, inoculation and the like are conventional and may be similar to those for the production of 7-chloro-5a,11a-dehydrotetracycline shown in U.S. Pat. No. 3,007,965 to Growich et al.

The 7-chloro-5a,11a-dehydrotetracycline may be isolated from the fermentation mash by any convenient means. One practical procedure involves a chromatographic separation in which the fermentation mash is acidified to pH 1-2 with a suitable mineral acid. The mash is then filtered and the acidified aqueous filtrate containing the activity is contacted with an alcohol to form an alcoholic extract. This extract is concentrated and then chromatographed on a diatomaceous earth column in the usual manner. The column is developed with a mixture of 80 percent n-butanol and 20 percent chloroform. The elected fractions are concentrated and freeze-dried. The crude freeze-dried material is dissolved in methanol and crystallization of the neutral form of the compound takes place rapidly. The crystals are filtered, washed and vacuum-dried in the usual manner. The mineral acid, alkaline earth metal and alkali metal salts of the compound may be prepared as described in the aforementioned U.S. Pat. No. 3,007,965 to Growich et al.

The invention will be described in greater detail in conjunction with the following examples.

EXAMPLE 1

Preparation of 7-chloro-5a,11a-dehydrotetracycline utilizing S. aureofaciens strain S-4596-1

Spores of S. aureofaciens strain S-4596-1 were washed from an agar slant with sterile distilled water to form a suspension containing approximately 60 million to 80 million spores per milliliter. A 0.33-milliliter portion of this suspension was used to inoculate an 8-inch test tube containing 8 milliliters of a medium prepared according to the following formulation:

| | | |
|---|---|---|
| Sucrose | | 30 grams |
| Ammonium sulfate | | 2 grams |
| Calcium carbonate | | 7 grams |
| Corn steep liquor | | 16.5 milliliters |
| Tap water | q.s. | 1,000 milliliters |

Prior to inoculation, the medium was sterilized for 20 minutes at 15 lbs. pressure, during which time the pH changed from 6.3 to 6.9. The inoculated shaker tube was then incubated in an inclined position for 24 hours at 28° C. on a 116 O.P.M. reciprocal shaker with a 1.5-inch stroke.

Two fermentation media were prepared as follows:

MEDIUM 1

| | | | |
|---|---|---|---|
| Ammonium sulfate | | 5.0 | g. |
| Ammonium chloride | | 1.5 | g. |
| Magnesium chloride | | 2.0 | g. |
| Starch | | 55.0 | g. |
| Potassium chloride | | 1.28 | g. |
| Phosphoric acid | | 0.4 | g. |
| Calcium carbonate | | 9.0 | g. |
| $FeSO_4 \cdot 7H_2O$ | | 0.060 | g. |
| $ZnSO_4 \cdot 7H_2O$ | | 0.100 | g. |
| $MnSO_4 \cdot H_2O$ | | 0.050 | g. |
| $CaCl_2 \cdot 6H_2O$ | | 0.005 | g. |
| Lard oil | | 20 | ml. |
| Water | qs. to | 1,000 | ml. |

MEDIUM 2

| | | | |
|---|---|---|---|
| Starch | | 67 | g. |
| Corn Steep | | 25 | g. |
| Calcium carbonate | | 9 | g. |
| Ammonium sulfate | | 6.7 | g. |
| Ammonium chloride | | 2 | g. |
| Manganese sulfate | | 0.10 | g. |
| Cobaltous chloride | | 0.005 | g. |
| Lard oil | | 35 | ml. |
| Water | qs. to | 1,000 | ml. |

A series of 250-milliliter Erlenmeyer flasks were prepared and divided into two groups. A 27 ml. portion of Medium 1 was transferred to each flask in Group I. A 27 ml. portion of Medium 2 was transferred to each flask in Group II. Each flask in both groups was inoculated with 1 ml. of the above-described inocula. Fermentations were carried out for 168 hours at 25° C. on a rotary shaker at 185 r.p.m. at which time the fermented mash was harvested. To prove that these strains are not riboflavin-deficient and that they do not respond to the addition of Cosynthetic Factor-1, these ingredients were added to the fermentation media, prior to sterilization, in the amounts stated in Table I. The harvest mash was assayed spectrophotometrically for 7-chloro-5a,11a-dehydrotetracycline. The presence of 7-chlorotetracycline or tetracycline was not detected when sought by means of precise paper chromatography and bio-autograph studies, the only product found being 7-chloro-5a,11a-dehydrotetracycline.

TABLE I

Assay Results From Fermentations Carried Out With Strain S-4596-1

| Concentration of Cosynthetic Factor-1 in micrograms/27 ml. of fermentation media | 7-chloro-5a,11a-dehydro-tetracycline (Spectrophotometric) in microg./ml. |
|---|---|
| Medium 1 | |
| 0.0 | 1,850 |
| 0.5 | 2,220 |
| 1.0 | 2,220 |
| 2.0 | 2,190 |
| 4.0 | 2,500 |
| Medium 2 | |
| 0.0 | 6,250 |
| 0.5 | 5,760 |
| 1.0 | 6,050 |
| 2.0 | 6,070 |
| 4.0 | 6,625 |

| Concentration of Riboflavin in micrograms/27 ml. | |
|---|---|
| Medium 1 | |
| 0.0 | 1,970 |
| 10.0 | 2,220 |
| 50.0 | 2,220 |
| 200.0 | 2,520 |
| Medium 2 | |
| 0.0 | 6,525 |
| 10.0 | 6,500 |
| 50.0 | 5,570 |
| 200.0 | 5,740 |

EXAMPLE 2

Preparation of 7-chloro-5a,11a-dehydrotetracycline utilizing S. aureofaciens strain S-4596-2 were washed from an agar slant with sterile distilled water to form a suspension containing approximately 60 million to 80 million spores per milliliter. The balance of the experiment was precisely the same as described in example 1. The results appear in Table II below. In like manner, the presence of 7-chlorotetracycline or tetracycline was not detected when sought by means of precise paper chromatography and bio-autograph studies, the only product found being 7-chloro-5a,11a-dehydrotetracycline.

TABLE II

Assay Results From Fermentations Carried Out With Strain S-4596-

| Concentration of Cosynthetic Factor-1 in micrograms/27 ml. of fermentation media | 7-chloro-5a,11a-dehydro-tetracycline (Spectrophotometric) in micrograms/ml. |
|---|---|
| Medium 1 | |
| 0.0 | 2,950 |
| 0.5 | 2,710 |
| 1.0 | 2,570 |
| 2.0 | 2,710 |
| 4.0 | 2,950 |
| Medium 2 | |
| 0.0 | 8,000 |
| 0.5 | 7,950 |
| 1.0 | 7,400 |
| 2.0 | 6,650 |
| 4.0 | 6,900 |

| Concentration of Riboflavin in micrograms/27 ml. | |
|---|---|
| Medium 1 | |
| 0.0 | 2,640 |
| 10.0 | 2,790 |
| 50.0 | 2,710 |
| 200.0 | 2,340 |
| Medium 2 | |
| 0.0 | 7,760 |
| 10.0 | 7,760 |
| 50.0 | 7,150 |
| 200.0 | 6,300 |

What is claimed is:

1. A process of producing 7-chloro-5 a,11 a-dehydrotetracycline which comprises cultivating a strain of Streptomyces aureofaciens which produces 7-chloro-5 a,11 a-dehydrotetracycline exclusively under submerged aerobic conditions in an aqueous nutrient medium containing assimilable sources of carbohydrate, nitrogen and inorganic salts until substantial quantities of 7-chloro-5 a,11 a-dehydrotetracycline are produced, said 7-chloro-5 a,11 a-dehydrotetracyclineproducing strain of Streptomyces aureofaciens being characterized by its ability to produce 7-chloro-5 a,11 a-dehydrotetracycline in the absence of riboflavin and by its failure to produce 7-chlorotetracycline in the presence of Cosynthetic Factor-1.

2. A process according to claim 1 wherein the strain of S. aureofaciens employed is NRRL No. 3269.

3. A process according to claim 1 wherein the strain of S. aureofaciens employed is NRRL No. 3270.

* * * * *